US012757951B2

(12) United States Patent
Birgen et al.

(10) Patent No.: US 12,757,951 B2
(45) Date of Patent: Oct. 13, 2026

(54) PARTITIONED PPE MASK OR RESPIRATOR

(71) Applicant: Floe Mask, LLC, Tempe, AZ (US)

(72) Inventors: William J Birgen, Tempe, AZ (US); Ronald Vinluan, San Diego, CA (US); Georgina Carrasco, San Diego, CA (US)

(*) Notice: Subject to any disclaimer, the term of this patent is extended or adjusted under 35 U.S.C. 154(b) by 995 days.

(21) Appl. No.: 17/995,440

(22) PCT Filed: Apr. 6, 2021

(86) PCT No.: PCT/US2021/026052

§ 371 (c)(1),
(2) Date: Oct. 4, 2022

(87) PCT Pub. No.: WO2021/207276

PCT Pub. Date: Oct. 14, 2021

(65) Prior Publication Data

US 2023/0165324 A1 Jun. 1, 2023

Related U.S. Application Data

(60) Provisional application No. 63/005,572, filed on Apr. 6, 2020, provisional application No. 63/198,104, filed on Sep. 29, 2020, provisional application No. 63/117,561, filed on Nov. 24, 2020.

(51) Int. Cl.

| | |
|---|---|
| ***A62B 23/06*** | (2006.01) |
| ***A41D 13/11*** | (2006.01) |
| ***A62B 23/02*** | (2006.01) |

(52) U.S. Cl.

CPC ........ *A41D 13/1107* (2013.01); *A62B 23/025* (2013.01)

(58) Field of Classification Search

CPC ............ A41D 13/1107; A41D 13/1161; A62B 18/02; A62B 23/02; A62B 23/06

See application file for complete search history.

(56) References Cited

U.S. PATENT DOCUMENTS

| | | | | |
|---|---|---|---|---|
| 2,751,905 A * | 6/1956 | Creelman | A41D 13/11 | 128/206.19 |
| 3,768,100 A * | 10/1973 | Colman | A41D 13/1161 | 2/9 |
| 4,095,290 A * | 6/1978 | O'Brien | A41D 13/11 | 2/9 |
| 11,064,744 B1 * | 7/2021 | Palacios | A41D 13/1107 | |
| 2009/0071483 A1 * | 3/2009 | Son | A62B 18/025 | 128/206.13 |

(Continued)

FOREIGN PATENT DOCUMENTS

| | | |
|---|---|---|
| DE | 202020107570 U1 | 3/2021 |
| GB | 209560 A1 | 1/1924 |

(Continued)

OTHER PUBLICATIONS

International Search Report from US/ISA.
Written Opinion of the International Searching Authority.
EPO Supplementary European Search Report, pp. 2-4, 5-6.

*Primary Examiner* — Camtu T Nguyen

(74) *Attorney, Agent, or Firm* — Venjuris P.C.; Michael Campillo

(57) ABSTRACT

A surgical mask having partitions that isolate the respiration from the nose and mouth of a wearer into two separate compartments or volumes.

2 Claims, 16 Drawing Sheets

(56) References Cited

U.S. PATENT DOCUMENTS

| | | | | |
|---|---|---|---|---|
| 2017/0258150 | A1 | 9/2017 | Abdulqader et al. | |
| 2019/0076680 | A1 | 3/2019 | Liu et al. | |
| 2020/0329792 | A1 * | 10/2020 | Howard | A41D 13/11 |
| 2021/0368874 | A1 * | 12/2021 | Eldibany | A62B 18/086 |
| 2022/0022571 | A1 * | 1/2022 | Araujo | A41D 13/1107 |

FOREIGN PATENT DOCUMENTS

| | | | |
|---|---|---|---|
| KR | 200392720 | Y1 | 8/2005 |
| KR | 20180003164 | U | 11/2018 |

* cited by examiner

SIDE

FRONT

ISOMETRIC

PARTITIONED PPE MASK OR RESPIRATOR

FIELD OF THE INVENTION

The present invention relates to masks to deter the sharing of respirated air with others.

BACKGROUND OF THE INVENTION

A typical prior art mask 1 or respirator covers the face with a single layer of filtration material with a limited surface area. See FIGS. 1 and 2. The filtration material may vary in design and material depending on the level of filtration provided by the mask. The typical prior art mask is uncomfortable to wear due to the heat buildup between the mask material and the wearer's skin. The heat buildup occurs because the mask's filtration limits the free flow of exhaled air from the nose or mouth which creates a backflow of warm and moist air 1A that warms the nostrils and face behind the mask and is unpleasant. This warm and moist backflow of air pervades throughout the face behind the mask and leaks out around the edges, which can fog glasses or allow viruses both into and out from the mask edges. This sensation of warm moist respiration around a user's nose is a complaint among prior art mask wearers, especially those that must wear them for extended periods of time such as medical professionals.

SUMMARY OF THE INVENTION

The partitioned surgical mask disclosed herein comprises a mask structure or construction with separate or isolated partitions or respiration volumes for the respective volumes of air that are respirated by the user nose and mouth. This partitioned surgical mask is more comfortable to wear for extended periods of time because partitioning moisture and heat buildup inside the mask created by user respiration is isolated from the user nose, which is more sensitive to warmth and moisture. Further, the more surface area there is around the volume of air sealed against the user face, the less restricted airflow is through the mask material which provides faster air flow and less heat and moisture accumulation. Heat expelled into the controlled volume, leaves this limited volume with the expelled air, and is replaced by ambient air, from outside the controlled mask volume through the process of breathing through the nose. Despite that the mask material is restrictive to flow in order to filter harmful matter carried in the air, the additional material and increased surface area dedicated the controlled air exchange volume means faster air flow and less heat buildup. Comfort is also increased by preventing exhausted air from flowing back onto the wearer's skin. A mask according to the disclosure may filter respiration from a user nose and user mouth separately. Aspects may be embodied in a mask with an oral respiration barrier and a nasal respiration volume attached to the oral respiration barrier and wherein the nasal respiration volume accessible for respiration through a nose aperture.

Numerous advantages and features of the present invention will become readily apparent from the following detailed description of the invention and the embodiments thereof, from the claims and from the accompanying drawings.

BRIEF DESCRIPTION OF THE DRAWINGS

FIGS. 8A-9E illustrate the various views of a first version of the second embodiment with first and second nasal respiration lateral panels 35 that extend along only a portion of the top edge of the oral respiration barrier 22, and shows that the nasal respiration volume 3 can be isolated and used separately from the oral respiration volume 2 or with a prior art mask as in FIG. 1;

FIGS. 9A-10E illustrate the various views of a second version of the second embodiment with first and second nasal respiration lateral panels 35 that extend along the entire top edge of the oral respiration barrier 22 and again shows that the nasal respiration volume 3 can be isolated and used separately from the oral respiration volume 2 or with a prior art mask as in FIG. 1;

FIG. 10 illustrates a third embodiment worn by a user to direct respiration from the user nose and user mouth into a nasal respiration volume 3 and an oral respiration volume 2, respectively;

Figure 1:
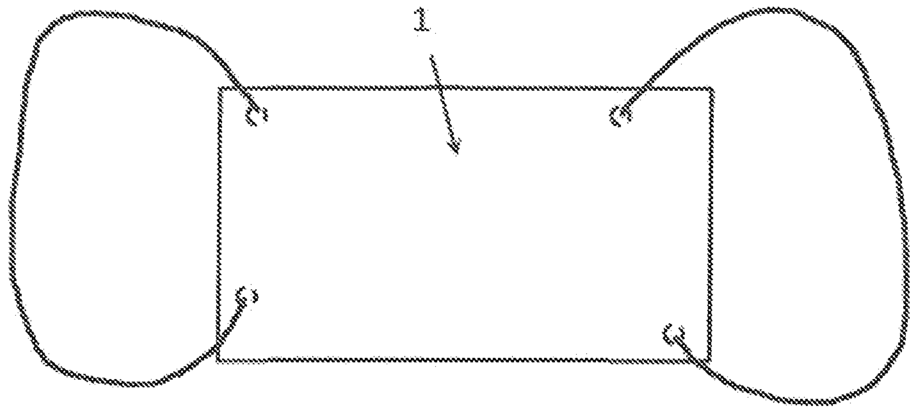
FIGS. 1-2 illustrate a prior art mask wherein a combined nose and mouth respiration volume or partition recirculates respirated warm and moist air 1A due to the single compartment or single panel 1 of filter media.
Figure 2:
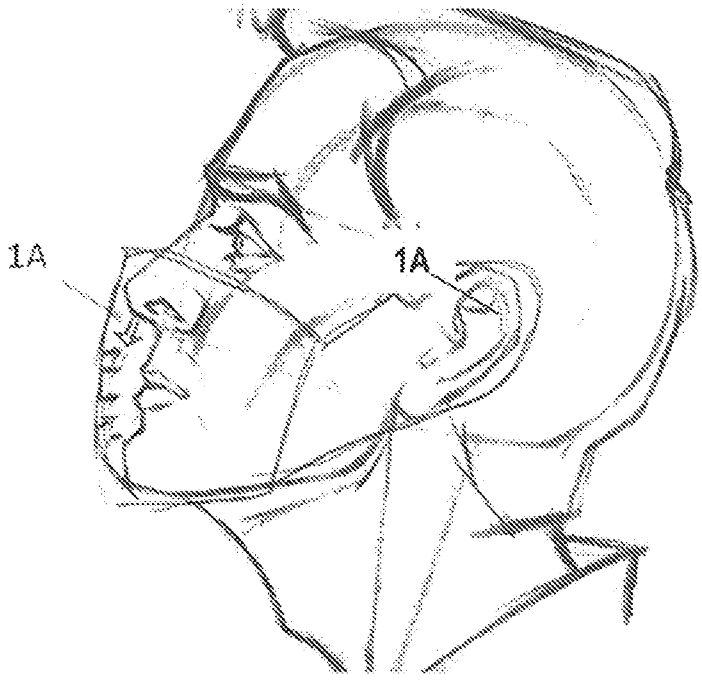
Figure 3A:
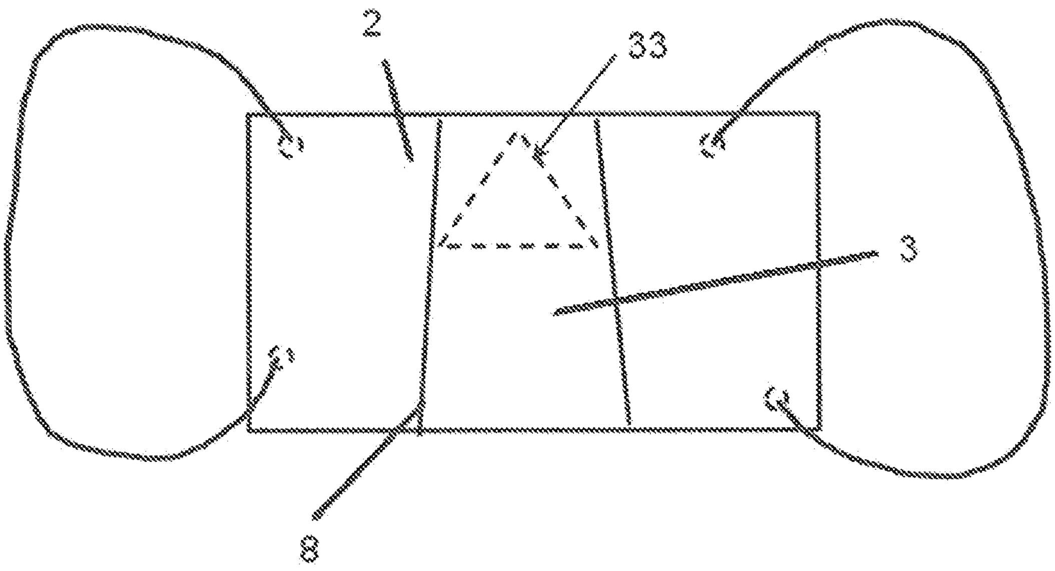
FIG. 3 illustrates a front view of a first embodiment incorporating aspects of the disclosure.
Figure 3B:
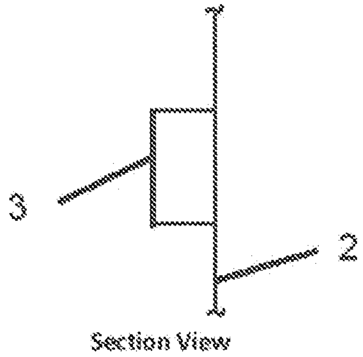
Figure 3C:
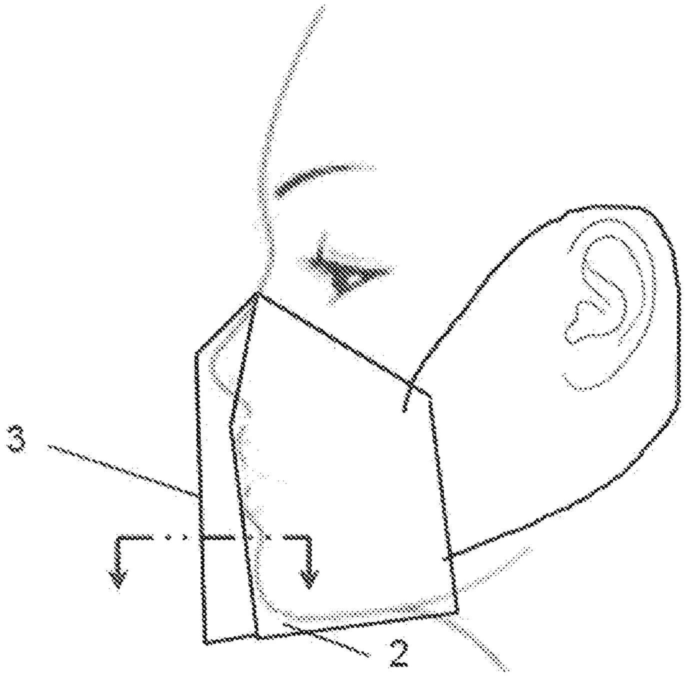

The objects, features and advantages of the present invention will be more readily appreciated upon reference to the following disclosure when considered in conjunction with the accompanying drawings, wherein reference numerals are used to identify the components in the various views.

DESCRIPTION OF PREFERRED EMBODIMENTS

The figures illustrate embodiments of a partitioned mask incorporating aspects of the invention. The aspects of the invention disclosed may be scaled in dimensions or modified for any and all face sizes and shapes. Accordingly, the respective dimensions of the illustrated features of the disclosed embodiments should not be construed as limiting any aspect of the invention.

FIGS. 3-10 illustrate first embodiment variations of a partitioned mask comprising a nasal respiration partition 3 and an oral respiration partition 2 and wherein each partition structure forms a respiration volume that intended for nasal or oral respiration, respectively, and deters the sharing or exchange of nasal and oral respiration gasses or components therein between the respective partitions. The partitioned mask described herein is preferably constructed of standard surgical mask filter media and materials although it is not limited thereto. A preferred panel used to construct an oral respiration barrier 2 or an nasal respiration partition comprises at least one layer of a first filter media with a Particle Filtration Efficiency (PFE) of at least about 0.1 micrometers, however, it is contemplated that relatively stiff filter media, or stiffening structures or material, may be added to either of the filter media of the nasal respiration partition 3 or the oral respiration partition 2 to extend the partition filter medial surfaces away from the wearer's nose or mouth and generate a greater volume within each partitioned compartment and reduce resistance to exhalation in either compartment.

Figure 4:
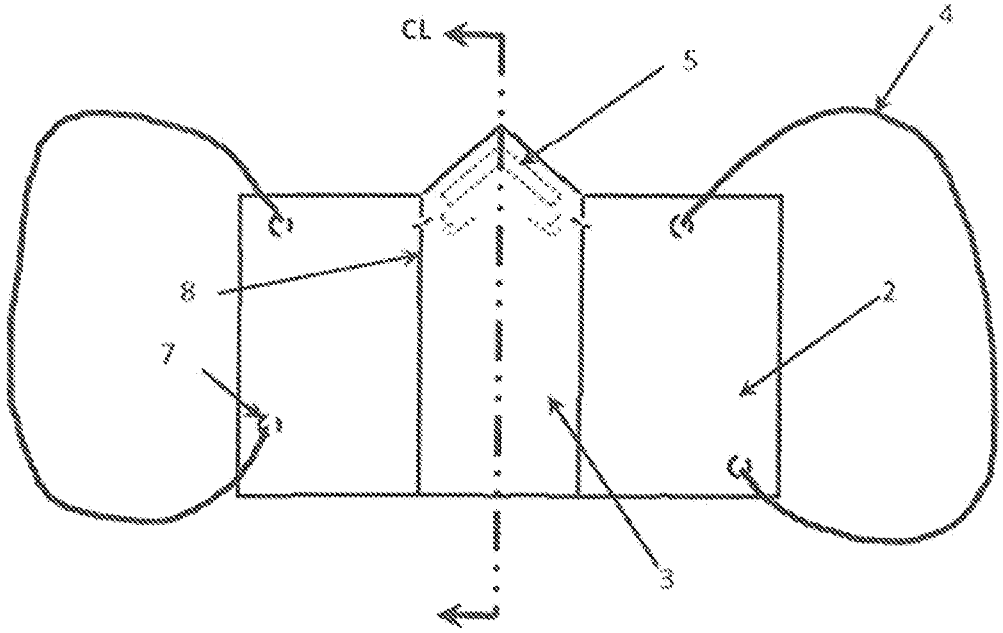
FIG. 4 illustrates a side view of a second embodiment of a partitioned mask according to this description illustrating separate nasal and oral respiration volumes or partitions.
Figure 5:
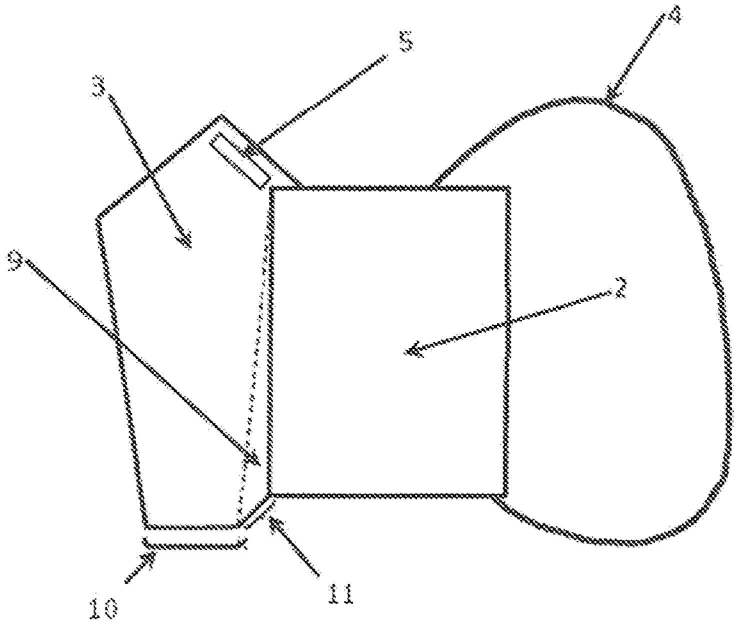
FIG. 5 illustrates a phantom side view of the second embodiment wherein airflow through the respective isolating partition walls 2 and 3 is illustrated by arrows 9 at or around the respective isolated partition walls 2 and 3.
Figure 6:
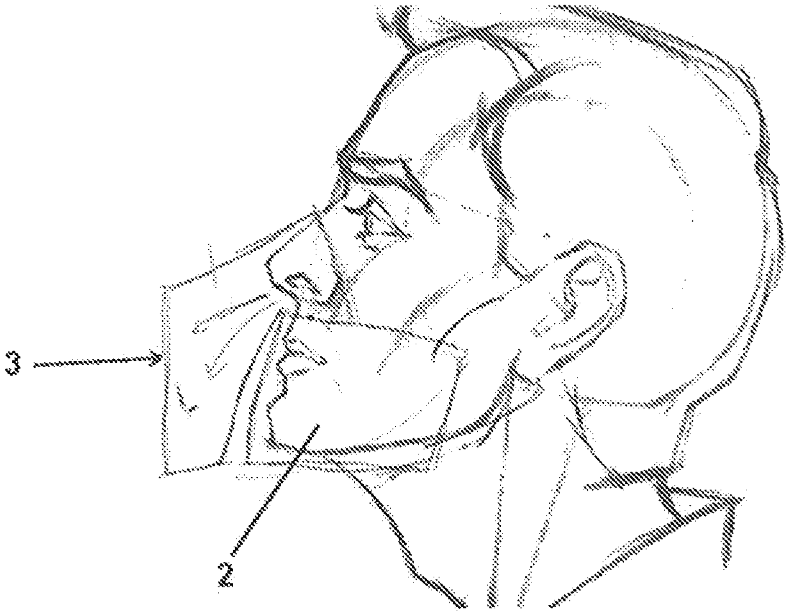
FIG. 6 illustrates a phantom side view of the second embodiment showing placement of the isolating nasal respiration partition walls 3 and oral respiration partition walls 2 on a user nose and mouth, respectively.
Figure 7A:
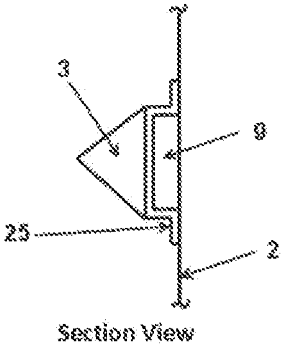
FIG. 7 illustrates the second embodiment including a spacer 25 positioned between the nasal respiration partition walls 3 and oral respiration partition walls 2 to create an air gap.
Figure 7B:
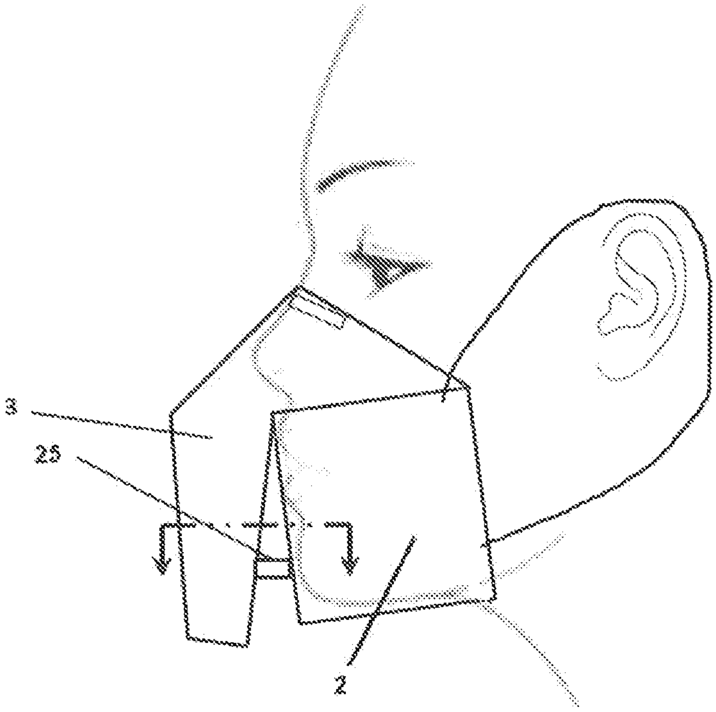
Figure 8A:
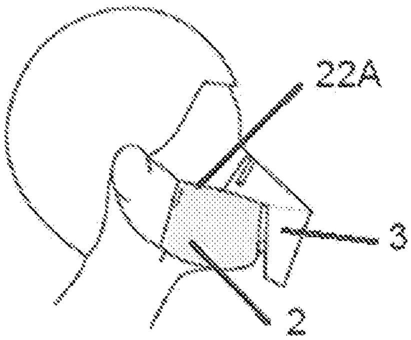
Figure 8B:
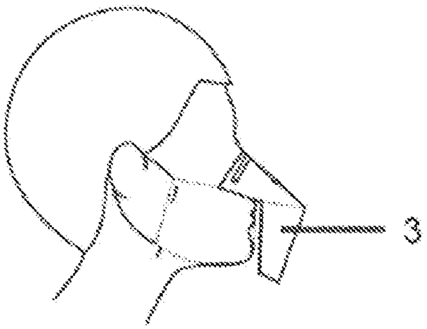
Figure 9A:
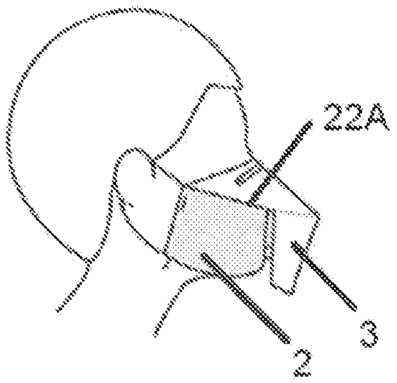
Figure 9B:
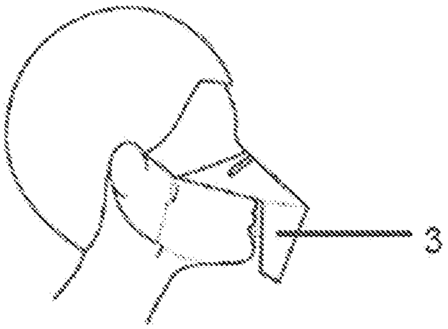
Figure 10:
Figure 11:
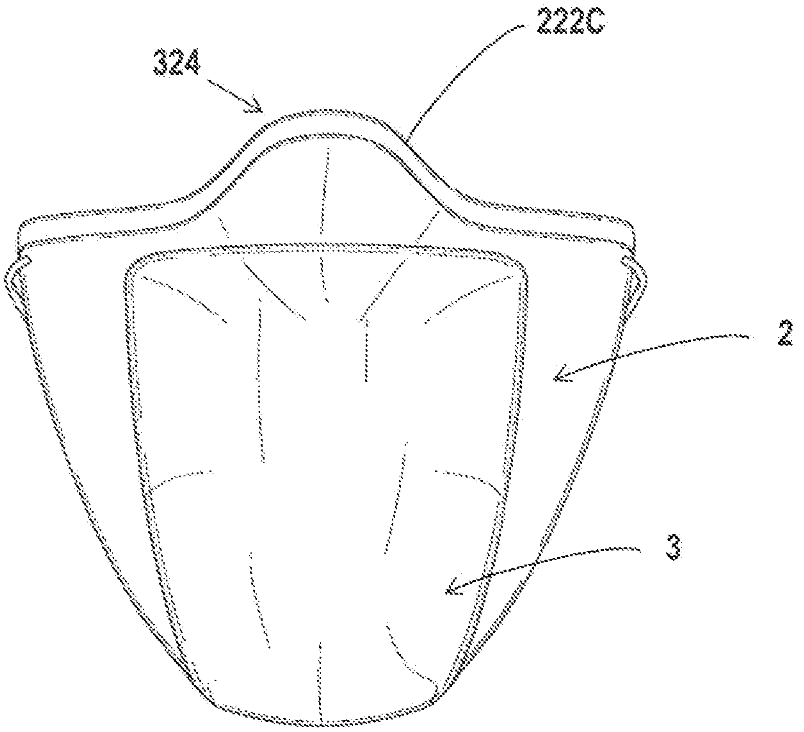
FIG. 11 illustrates a front view of the third embodiment and shows the oral respiration barrier 222 forming the oral respiration volume 22 and a first nasal respiration volume panel 310.
Figure 12:
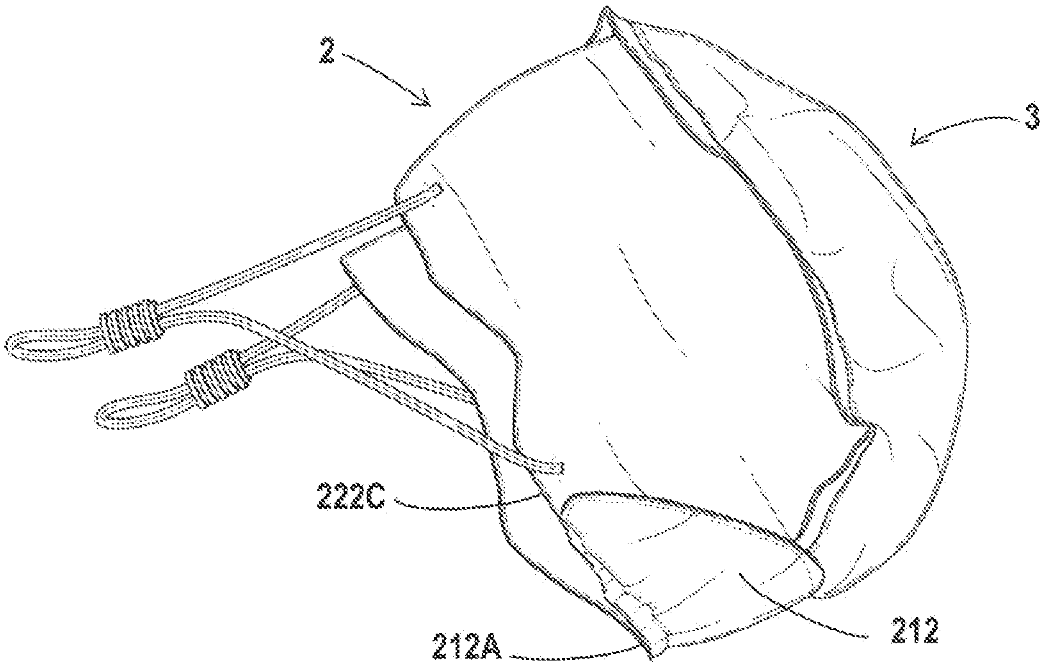
FIG. 12 illustrates a side view of the third embodiment showing the nasal respiration volume 33 and the oral respiration volume 22 and the connection of the oral respiration volume 22 to the lower portion of the oral respiration barrier 222.
Figure 13:
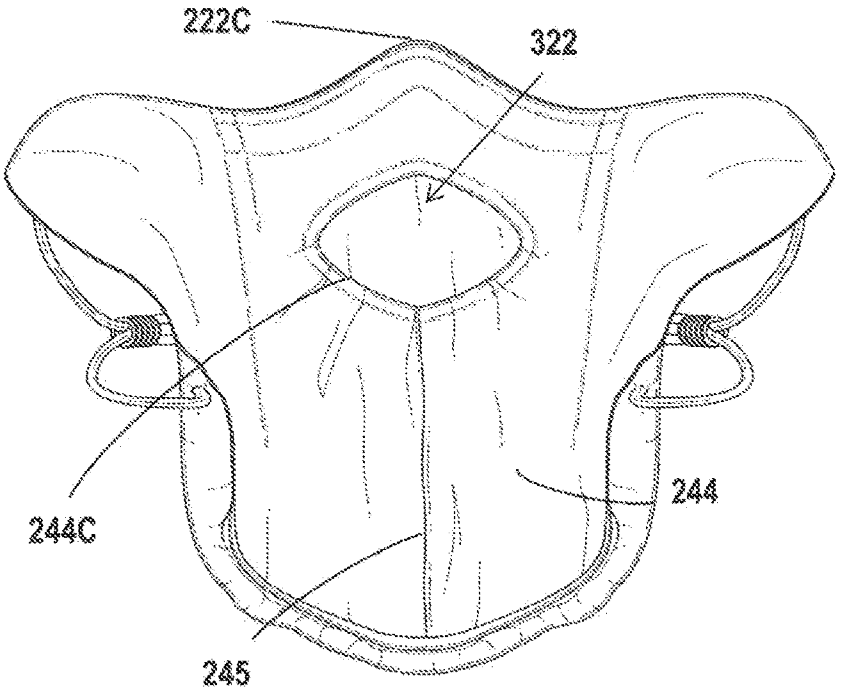
FIG. 13 illustrates a rear view of the third embodiment showing the nasal or nose aperture 322 created from the oral respiration barrier panel concave edge 244C which is aligned with the first nasal respiration volume panel 320 collar-shape 315.

In the first embodiment variations, the mask nose and mouth partitions, 2 and 3 respectively, may each be constructed from a substantially rectangular panel(s) of filter media. See e.g., FIGS. 3A-3C. The nasal respiration partition 3 may comprise a tubular structure that is centered and affixed to the oral respiration partition 2 and wherein a nasal respiration aperture 33 comprising a triangular cutout in the oral respiration partition 2 filter panel dimensioned to fit and receive a user nose provides access and respiratory communication from the user nose to the nasal respiration volume. Additionally, as illustrated in FIGS. 4-6, the filter media panel used for the nose partition 3 may comprise an additional length to accommodate the wearer's nose ridge and a malleable metal wire or semi-rigid insert 5 may be added at and along the top edge of the nose partition 3 material to provide a support for the mask on the wearer's nose ridge as illustrated in the figures. Elastic ear loops 4 may be attached to the mouth partition 2 side edges, such as by glue, grommets 7, or sonic welding to allow a wearer to secure the mask around his or her head. The panel into which the nose partition 2 is made may folded along a center line CL to create side panel edges that are and connected along and perpendicular to the long dimension of the oral respiration partition 2 by glue or sonic welding 8 such that the side panel edges extend away from the oral respiration partition 2 filter media panel as a tent-like structure. FIG. 5 illustrates a side view of the first embodiment showing an optional modification wherein the nasal respiration partition 3 may have a nasal respiration partition height or depth 10 dimension that tapers or varies in the distance of the apex of the tent-like structure from the outside surface of the panel that comprises the oral respiration partition 2 and have a nasal respiration partition base width 11 that is attached to the oral respiration partition 2 at the center line of the oral respiration partition 2 but not entirely laterally therefrom for the width 11 which further enables the flow of fresh air or respiration from other than in front of the oral respiration partition 2 into the nasal respiration partition 3, and vice-versa as illustrated in FIG. 6. FIGS. 7A-7B illustrate another version of the embodiment with the addition of a spacer or bridge 25 positioned against and between the outside surface of the oral respiration partition 2 and the outside-backside surface of the nasal respiration partition 3 to facilitate and augment the air gap 9 and create an airflow path. As illustrated in FIG. 7A, the bridge 25 may be substantially rectangular shaped with a missing side segment and with feet extending perpendicularly from the adjacent side segment of the bridge 25 and lateral relative to the outside surface of the oral respiration partition 2 panel. Further, as illustrated in FIGS. 8A-9B, a mask incorporating aspects of the invention may comprise a construction wherein the oral respiration barrier 2 has top edge 22A and the bottom edge of the nasal respiration partition 3 attaches to at least a section of the oral respiration barrier top edge 22A as most clearly illustrated in FIG. 8A, or attaches for substantially the entire section of the top edge 22A as illustrated in FIG. 9A, and further, aspects of the invention may be embodied as a nasal respiration partition 3 constructed and used separate from the oral respiration partition 2 as illustrated in FIGS. 8B and 9B.

FIGS. 10-20 illustrate and alternate third and fourth preferred embodiments. The alternate third and fourth embodiments also filter respiration from a user's nose and user's mouth separately and comprise an oral respiration volume constructed from one or more an oral respiration partition(s) or barrier(s) which may each be comprised of one or more sheets or panels of a first filter media, and a nasal respiration volume constructed from one or more an nasal respiration partition(s) or barrier(s) that may also be comprised of one or more sheets or panels of the first or a second filter media. Again, at least one panel of filter media separates the nasal respiration volume and the oral respiration volume to deter the exchange of respiration from a user's nose to a user's mouth, and vice-versa. In the third and fourth embodiments, the oral respiration barrier 2 may be substantially convex and have an oral respiration barrier first side, an oral respiration barrier second side positioned towards the user's face and away from the user's face, respectively. The oral respiration barrier of the alternate third and fourth preferred embodiments are preferably constructed from a plurality of filter panels that are sewn or otherwise secured together as is common in the art to form the convex shape of the oral respiration barrier. See e.g., FIGS. 15 and 21.

Figure 14:
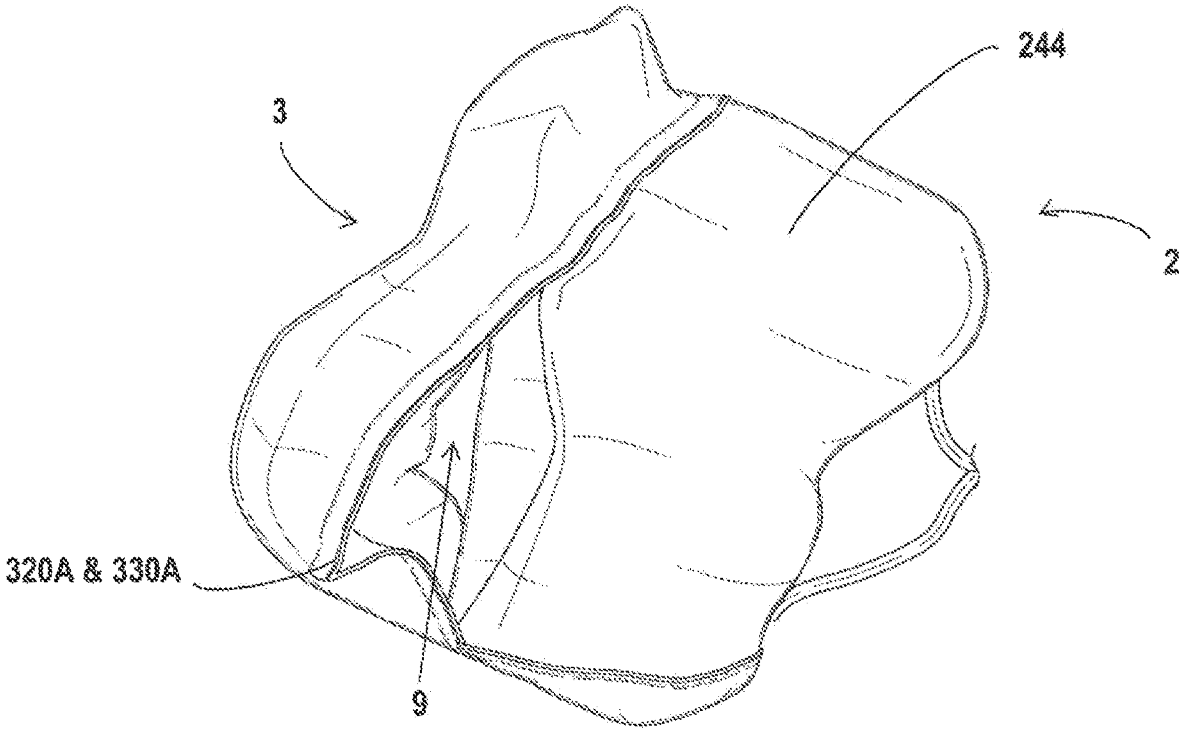
FIG. 14 illustrates a left side view of the third embodiment showing the nasal respiration volume 3 created from stitching or welding the first and second nasal respiration volume panels 320 & 330, along the longitudinal edges 320A and 330A to form a longitudinal tubular shape for the nasal respiration volume 3 that is in fluid communication with the nasal aperture 322 and that has an air gap 9 between the backside or outside surface of the first nasal respiration volume panel 320 and the outside-front surface of the substantially convex oral respiration barrier 2.
Figure 15:
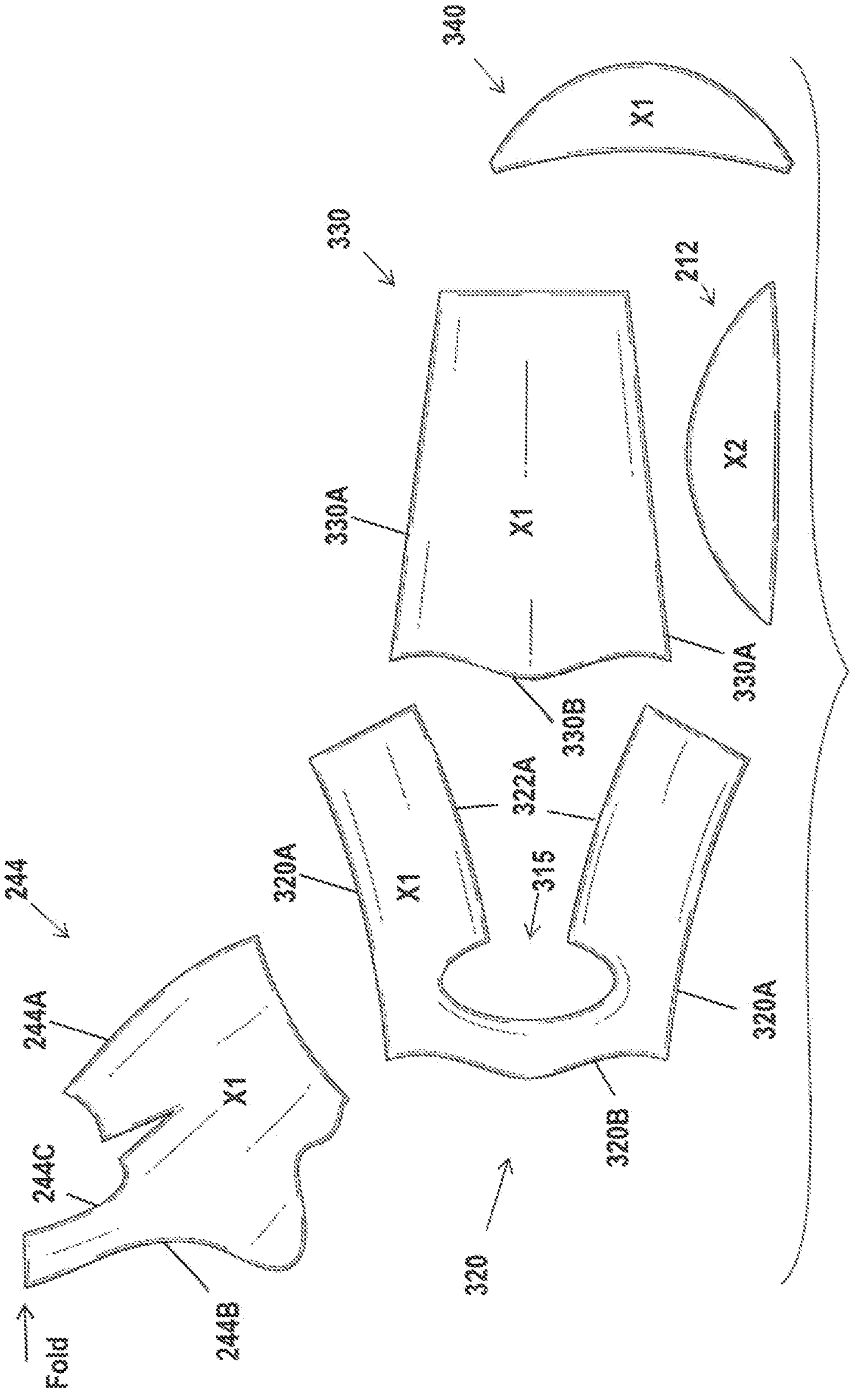
FIG. 15 illustrates preferred cut-patterns for the panels that may be formed into the third embodiment and that the pair(s) of panels e.g., first and second oral respiration barrier panels 224 may be formed from cut from a single piece (i.e. "X1") of filter media that is folded along the line indicated by "fold" and unfolded to create a symmetrical first and second oral respiration barrier panels 224 reflected around the edge indicated by "fold"
Figure 16:
FIG. 16 illustrates a fourth embodiment worn by a user to direct respiration from the user nose and user mouth into a nasal respiration volume 3 and an oral respiration volume 2, respectively.
Figure 17:
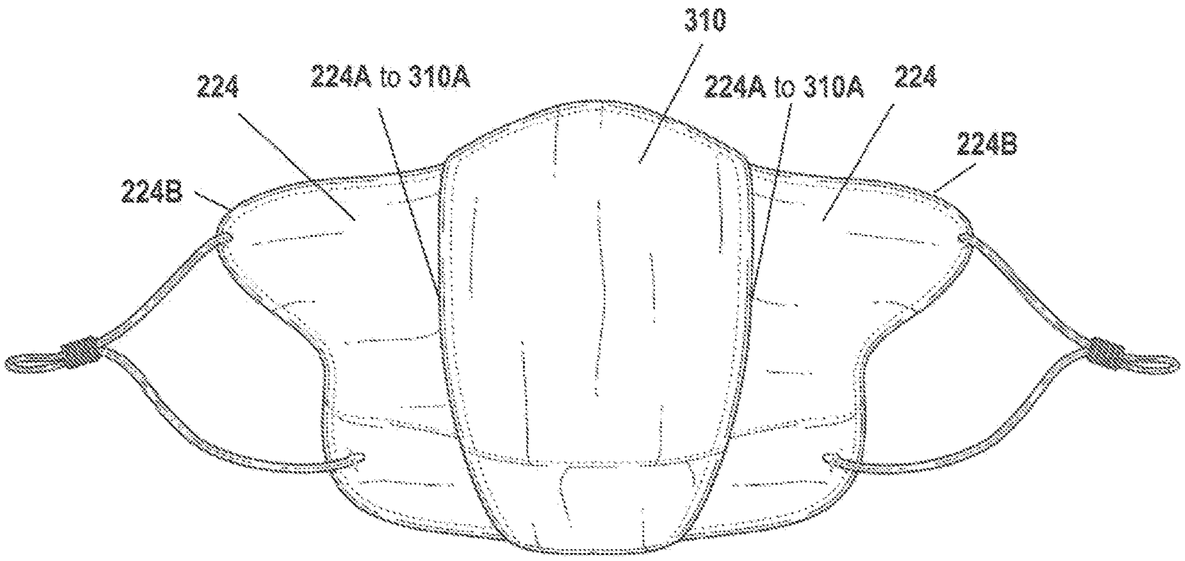
FIG. 17 illustrates a front view of the fourth embodiment showing the first and second oral respiration barrier panels 224 and the second nasal respiration volume panel 310.
Figure 18:
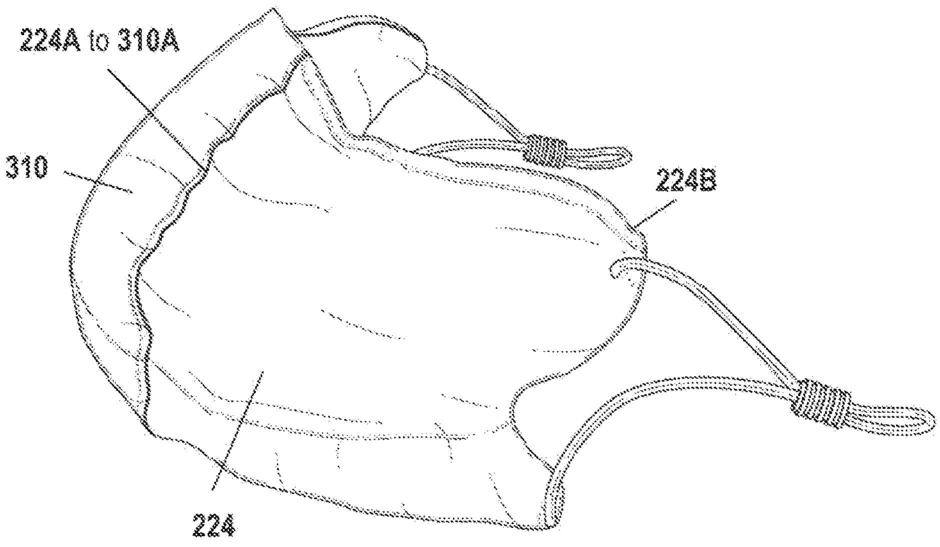
FIG. 18 illustrates a left side view of the fourth embodiment showing the left oral respiration barrier panel 224 and the second nasal respiration volume panel 310.
Figure 19:
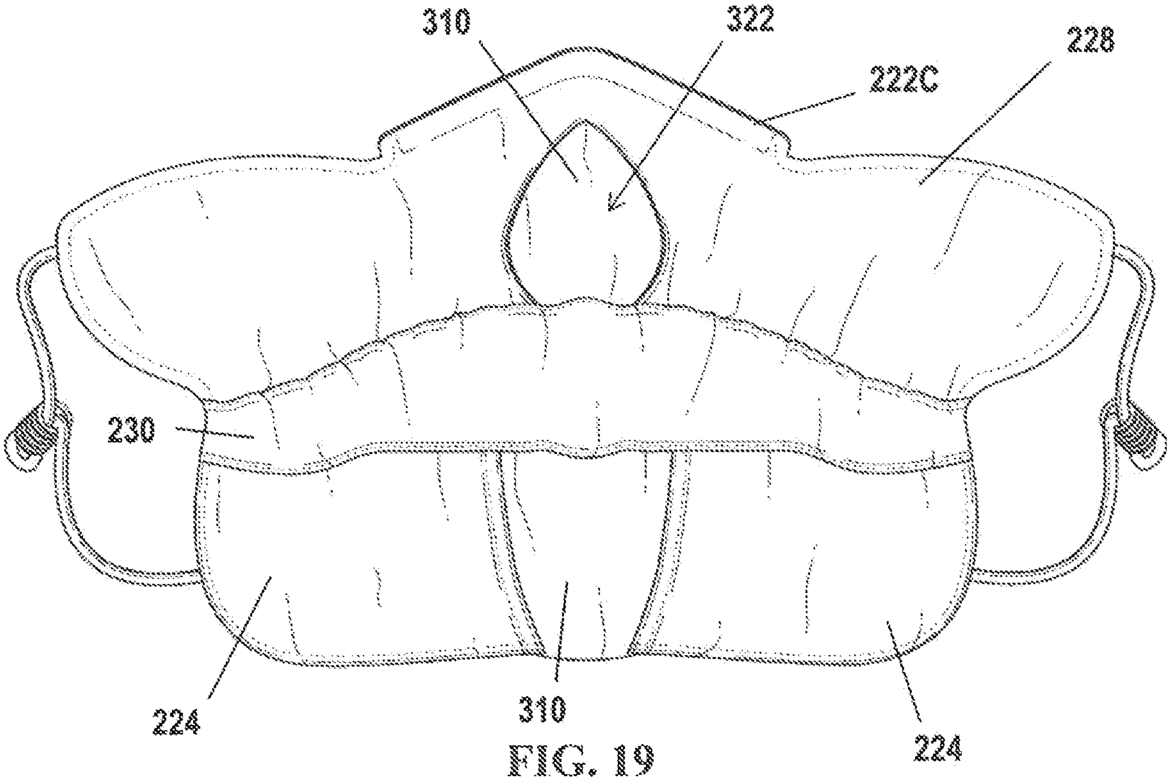
FIG. 19 illustrates a rear view of the fourth embodiment showing the first and second oral respiration barrier panels 224 respectively connected on either side of and to the outer surface of the longitudinal nasal respiration volume 3 created by the first and second nasal respiration volume panels 310, and the arch-shaped panel 228 used to form the nasal aperture 322, and the hill-shaped panel 230 stitched or welded to and laterally across the first and second oral respiration barrier panels 224 and sized and dimensioned for location before a user's mouth to further deter oral respiration from the user into the nasal respiration volume 3.

In each embodiment, the finished mask has an oral respiration barrier outer edge 222C with a smooth hump or peak at a middle top edge that transitions to negative smooth curved sloped edges therefrom (see FIG. 11) symmetrically on both sides from the smooth hump or peak to first and second edges, which may be complex and convex shaped edges, and then to a middle bottom convex edge. A semi-rigid nose-stay 324 is sewed into or otherwise affixed in or to the oral respiration barrier outer edge 222C at a center position and along the smooth hump outline, and a nose aperture 322 is positioned adjacent-under the semi-rigid nose-stay 324. In use, the mask is worn on a user's face by placement of the oral respiration filter over the user's mouth and placement of the nose aperture 322 over the user's nose to deter the exchange of respiration from the user's mouth to the user's nose, and vice versa. Further, in both embodiments, the middle bottom convex edge may be comprised of a chin panel 210 that is a hill-shaped panel 212 (see FIG. 12) with a substantially linear edge 212A that is stitched or otherwise affixed to a bottom middle of the oral respiration barrier outer edge 222C. The oral respiration barrier 2 may be constructed from a pair oral respiration barrier panels 244 that have a concave edge 244C (in which wedge-relief may be cut), a substantially linear edge 244A (which may be made slightly convex as illustrated in FIG. 15). In the preferred manor of constructing the embodiment, the oral respiration barrier panels 244 are made by cutting the illustrated pattern from a panel of filter that is folded in two so that the cut pattern creates two matching oral respiration barrier panels 244 that when unfolded remain connected to each other at a rectangular segment between the two panels 244 and forming a perimeter for the nasal aperture 322 from the oral respiration barrier concave edge 244C. The unfolded oral respiration barrier panels 244 may be stitched or welded together along the substantially linear edges 244A of each panel forming a seam 245 and an aperture for the nasal aperture 322 in the oral respiration panel 244 to form a substantially convex oral respiration barrier 2. The nasal respiration volume is constructed from a first nasal respiration volume panel 320 and a second nasal respiration volume panel 330 that are joined to each other along the longitudinal edges 320A and 330A to form a longitudinal tubular shape for the nasal respiration volume 3. In the illustrated embodiment, the first nasal respiration volume panel 320 may have a collar-shape or dicky-shape 315 at a first end that may be formed into the nose aperture 322 by forming a nose hump or ridge along a center line of the shorter edge 320B of the first nasal respiration volume panel 320 that comprises the collar-shape and sewing together the inside longitudinal edges 322A that extend from the collar-shape to create a first nasal respiration volume panel seam that extends from the nose aperture 322 to the bottom edge of the nasal respiration volume. Moreover, the longitudinal edges 322A of the first nasal respiration volume panel 320 may be slightly curved as illustrated or substantially linear. The second nasal respiration volume panel 330 of this embodiment may comprise a substantially rectangular-shaped filter panel, or as illustrated a substantially trapezoidal shaped panel of filter media wherein the long edges 330A of the panel 330 are preferably substantially linear and substantially, but optionally not exactly, parallel. In construction, the first and second nasal respiration volume panels, 320 and 330, respectively, are connected to each other along the longer edges, 320A and 330A, to form a tubular shape for the nasal respiration volume 33, which tubular shape first end-perimeter is connected at first ends, 320B and 330B, to the perimeter formed by the oral respiration barrier concave edge 244C to form the nose aperture 322, and which tubular shape second end-perimeter is closed and optionally attached to the middle bottom convex edge 222C of the oral respiration barrier 2, thereby forming an air gap 9 between the oral respiration barrier 2 and the nasal respiration volume 33 as illustrated in FIG. 14.

Figure 20:
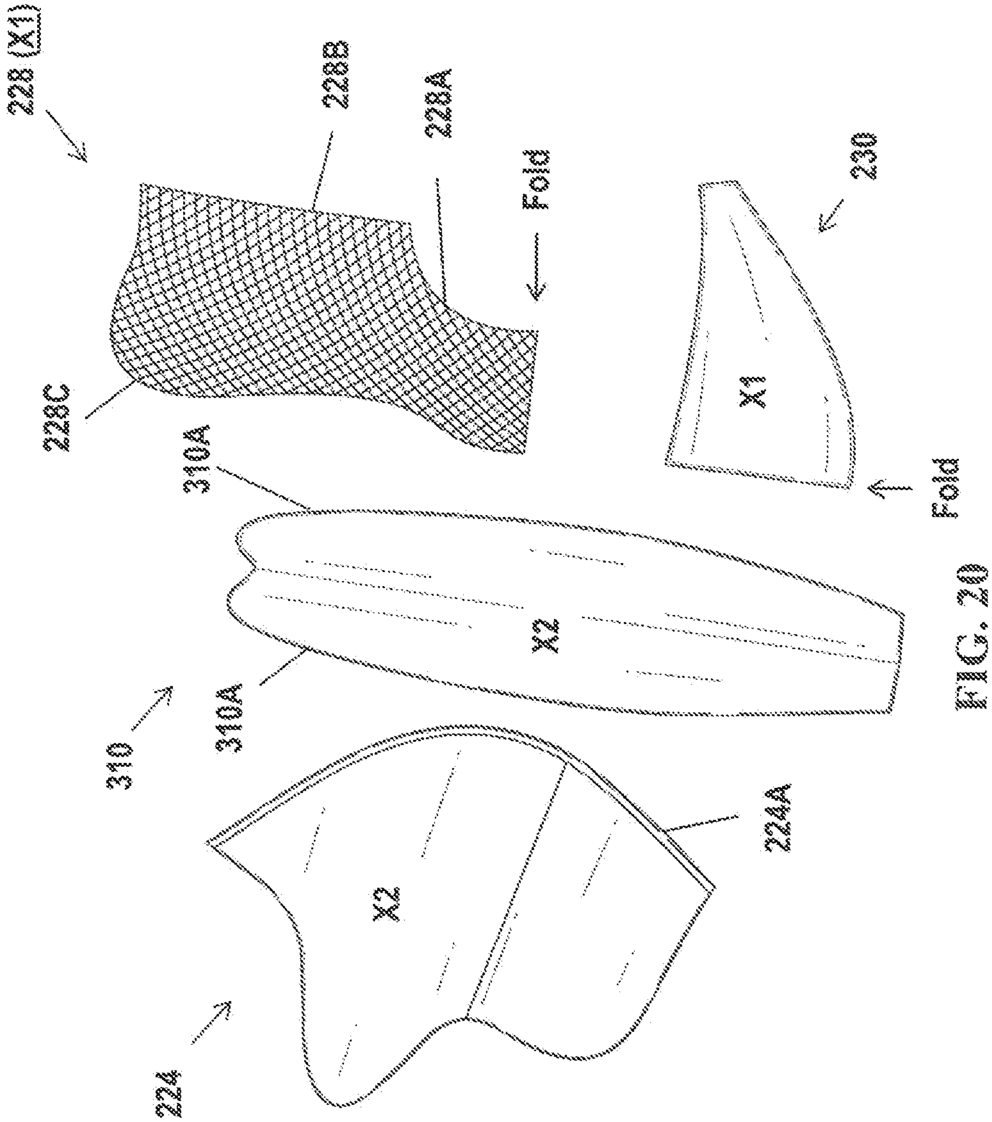
FIG. 20 illustrates preferred cut-patterns for the panels that may be formed into the fourth embodiment and that each the matching or pairs of panels e.g., first and second oral respiration barrier panels 224 and the first and second nasal respiration volume panels 310 indicate they are pairs by the "X2" and illustrating that the arch-shaped panel 228 and the hill-shaped panel 230 may be formed from cut from a single piece of filter media that is folded along the line indicated by "fold" and unfolded to create symmetrical patterns for the arch-shaped panel 228 and the hill-shaped panel 230 reflected around the "fold"

In the fourth preferred alternate embodiment (See FIGS. 16-20), the oral respiration barrier may be constructed from first and second oral respiration barrier panels 224 that each have a convex curved first edge 224A and a combination curved second edge 224B (see FIG. 17) and the nasal respiration volume 3 may be constructed from substantially longitudinal first and second nasal respiration volume panels 310 that may each have first and second panel convex edges 310A. FIG. 20 illustrates the cut-patterns for the panel shapes and relative dimensions of each. The fourth embodiment of the mask may be constructed by sewing or sonically welding each of the first panel edges 310A along and to each of the second panel edges 310A for a portion of the length to create a longitudinal volume that is open on the end perimeters. Each of the convex curved first edges 224A of the first and second oral respiration barrier panels 224, respectively, are connected on either side of and to the outer surface (224A to 310A) of the longitudinal volume created by the longitudinal first and second nasal respiration volume panels 310 that creates an interim structure comprising a substantially convex oral respiration barrier 2. Preferably, a substantially non-permeable filter media panel is positioned in front of the user mouth in the substantially convex oral respiration barrier 2, which substantially non-permeable filter media panel may comprise hill-shaped panel 230 sized and dimensioned for position in front of the user's lips may be connected laterally across the created substantially convex oral respiration barrier 2. The first nasal volume respiration panel 310 (i.e., the panel 310 on the inside of the oral respiration barrier 2) may be trimmed laterally with the top of the hill-shaped panel 230. A nasal or nose aperture 322 is added and centered above the trimmed first nasal volume respiration panel 310 and may be made from an arch-shaped panel 228 (e.g., a mesh arch-shaped panel 228 as illustrated) and affixed along the top or hill edge of the hill-shaped panel 230 and to and along the top and side edge of the oral respiration barrier outer edge 222C. The nasal respiration volume 3 thus comprises the volume between the arch-shaped panel 228 and the second nasal volume respiration panel 310.

Figure 21A:
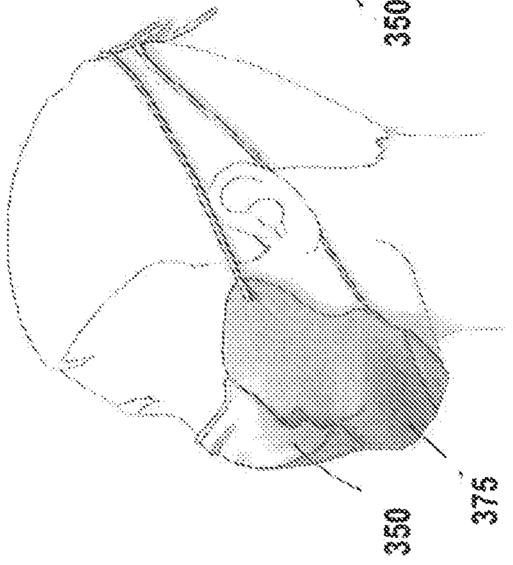
FIG. 21A-21C illustrate a side, front, and isometric views of a fifth alternate embodiment worn by a user to direct respiration from the user nose and user mouth into a nasal respiration volume 3 and an oral respiration volume 2, respectively.
Figure 21B:
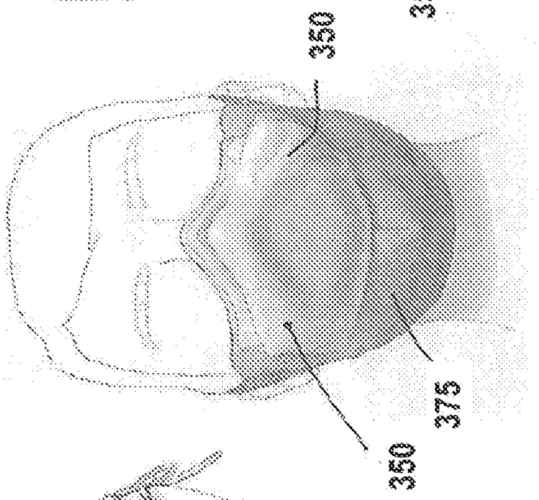
Figure 21C:
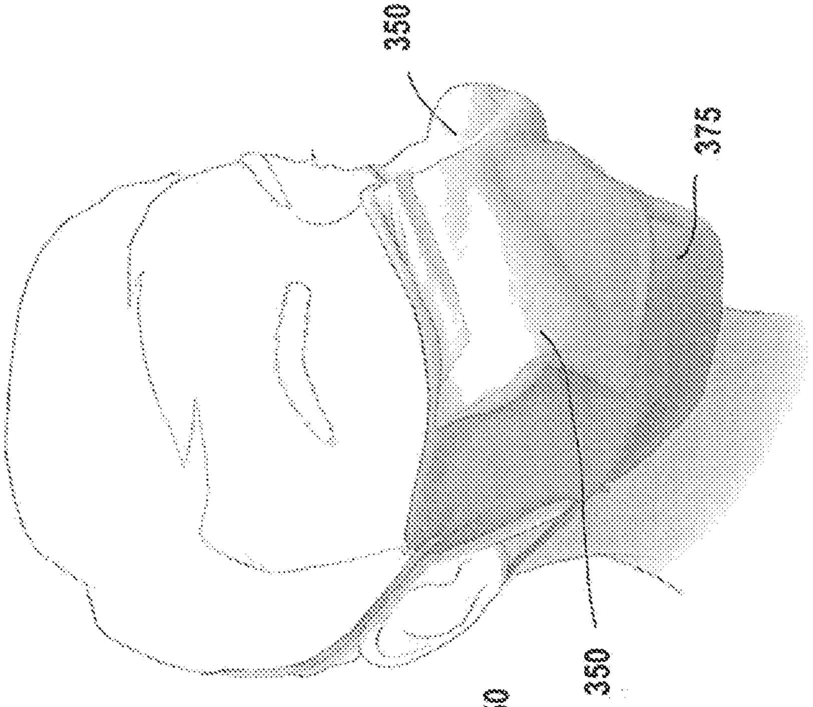
Figure 22:
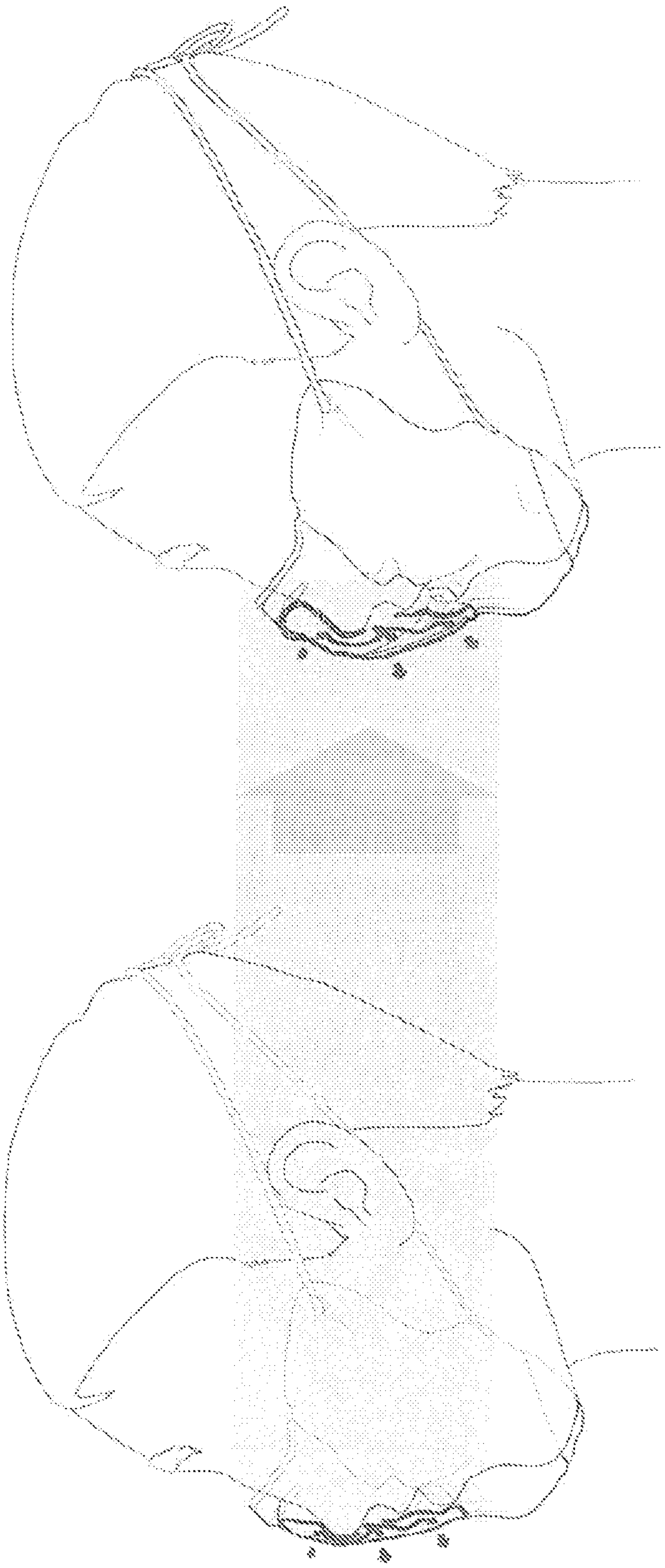
FIG. 22 illustrates a side view of the fifth embodiment showing the nasal respiration patterns.
Figure 23:
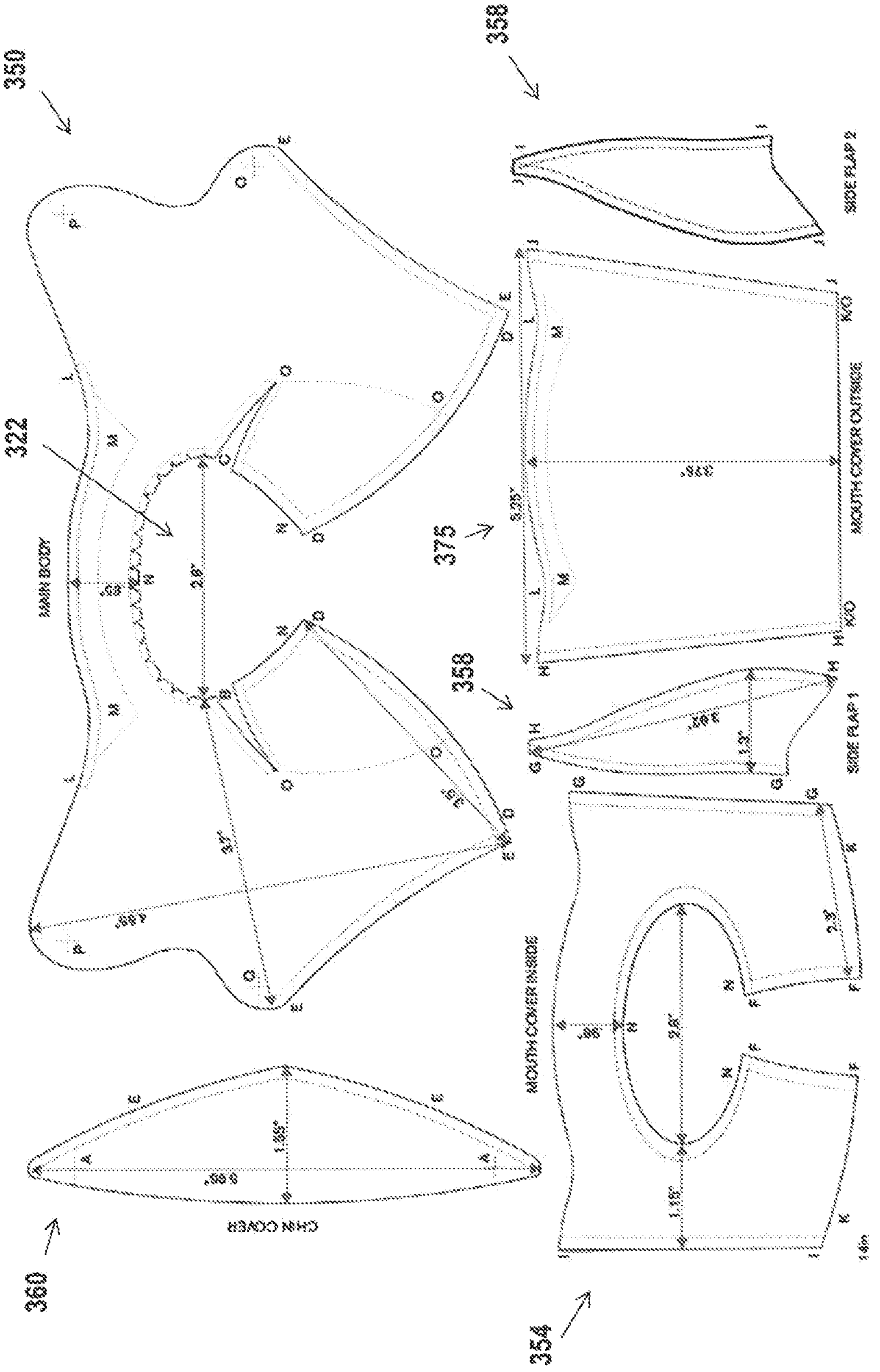
FIG. 23 illustrates preferred cut-patterns for the panels that may be formed into the fifth embodiment.

FIGS. 21-23 illustrate a fifth alternate embodiment the mask wherein the nasal respiration volume comprises at least one but preferably two lateral nose-respiration volumes within or behind two lateral nose-respiration barriers 350 that provide a respiration volume separate and apart from a dedicated an oral respiration volume within and behind an oral respiration barrier 375. The separate nasal and oral respiration volumes respectively, may be separated by at least one layer of filter media such that a predominance of the oral respiration occurs in and through the oral respiration volume and a predominance of the nasal respiration occurs in and through the nasal respiration volume. The illustrated embodiment of a lateral nose-compartment mask may be constructed from several cut or stamped fabric pieces that may be sewn or adhered together to form a lateral nose-compartment mask with substantially distinct nasal and oral respiration paths, partitions, and volumes within. See FIG. 23. A substantially dicky or collar-shaped MAIN BODY 350 panel may have two matching convex edges D adjacently extending from a collar shaped perimeter N and a combination shaped outside panel edge that includes a convex upper outer edge P. The matching convex edges D may be joined to create a convex nasal respiration volume with a nose aperture 322 comprising the collar shaped perimeter N and elastic ear loop ends to secure the mask to the user face may be attached to the convex upper outer edge P. The oral respiration volume may be created by a MOUTH COVER INSIDE 354 panel having a substantially dicky or collar-shaped inside edge N and side edge segments, I-I & G-G, left and right, SIDE FLAP panels 358 with side edge segments G-G & H-H and J-J & I-I, respectively, and a MOUTH COVER OUTSIDE 356 panel with side edge segments H-H & J-J. A three-dimensional oral respiration volume 3 may be created by connecting, such as by sonic or hot weld or stitch, the MOUTH COVER INSIDE 354 side edge segments G-G along and to the right SIDE FLAP panels 358 side edge segments G-G, and along and to the left SIDE FLAP panel 358 side edge segments I-I, the left and right SIDE FLAP panel 358 side edge segments H-H & J-J, respectively, to the MOUTH COVER OUTSIDE 356 side edge segments H-H & J-J. As illustrated the MOUTH COVER INSIDE 354 panel and MOUTH COVER OUTSIDE 356 panel may be substantially rectangular or trapezoidal and the left and right, SIDE FLAP panels 358 may be somewhat rectangular or somewhat curved-triangular shaped (as illustrated) to create a separation between the MOUTH COVER INSIDE 354 panel and MOUTH COVER OUTSIDE 356 panel that is equivalent to at least about the dimension of the left and right SIDE FLAP panel 358 bottom edge segments, G-H and J-I when constructed as described. The oral respiration volume 375 may be connected on the inside surface of the nasal respiration volume 350 by connecting and/or aligning the respective edge segments from the MOUTH COVER INSIDE 354 panel and MOUTH COVER OUTSIDE 356 panel to finalize the mask construction and wherein the filter media and the static deformation of the MAIN BODY 352 may create vaulted nasal respiration volumes 350 and pathways away from the mouth and laterally adjacent the cheek of the mask user.

While various embodiments have been described above, it should be understood by a person of ordinary skill in the art that the description has been presented by way of example only, and not limitation. Thus, the breadth and scope of the claims or a preferred embodiment should not be limited by any of the above-described exemplary embodiments but should be defined only in accordance with the following claims and their equivalents.

What is claimed is:

1. A mask for a user, comprising:

a first respiration partition comprised of a first filter media, the first respiration partition comprised of first and second opposing side edges and a middle bottom edge, the first respiration partition formed to have a convex shape;

an aperture in the first respiration partition, the aperture positioned in the first respiration partition; and a second respiration partition attached to the first respiration partition, the second respiration partition comprised of at least a second filter media with an open end and a closed end, the open end coupled around the aperture;

wherein the first respiration partition is configured to seal against the user's face around the user's nose, against the user's cheeks at the first and second opposing side edges, and conform against and under the user's chin at the middle bottom edge, the convex shape configured to cover the user's mouth therein;

wherein the aperture is configured for receipt of the user's nose therethrough;

wherein the second respiration partition is configured for receipt of respiration from the user's nose; and wherein the first respiration partition is configured for receipt of respiration from the user's mouth.

2. The mask in claim 1, further comprising a semi-rigid nose-stay in the first respiration partition above the aperture.

* * * * *